United States Patent
Johansson (10) Patent No.: US 11,971,076 B2
(45) Date of Patent: Apr. 30, 2024

(54) WHEEL BRAKE ARRANGEMENT

(71) Applicant: Volvo Truck Corporation, Gothenburg (SE)

(72) Inventor: Owe Johansson, Veddige (SE)

(73) Assignee: Volvo Truck Corporation, Gothenburg (SE)

( * ) Notice: Subject to any disclaimer, the term of this patent is extended or adjusted under 35 U.S.C. 154(b) by 944 days.

(21) Appl. No.: 16/966,632

(22) PCT Filed: Feb. 1, 2018

(86) PCT No.: PCT/EP2018/052528
§ 371 (c)(1),
(2) Date: Jul. 31, 2020

(87) PCT Pub. No.: WO2019/149363
PCT Pub. Date: Aug. 8, 2019

(65) Prior Publication Data
US 2021/0033159 A1 Feb. 4, 2021

(51) Int. Cl.
*F16D 65/09* (2006.01)
*B60T 1/06* (2006.01)
(Continued)

(52) U.S. Cl.
CPC .......... *F16D 65/0976* (2013.01); *B60T 1/065* (2013.01); *F16D 55/225* (2013.01);
(Continued)

(58) Field of Classification Search
CPC ............ F16D 65/0976; F16D 65/0056; F16D 55/225; F16D 2055/0008; F16D 2127/02; B60T 1/065
(Continued)

(56) References Cited

U.S. PATENT DOCUMENTS 3,172,423 A 3/1965 Steinman
3,712,423 A 1/1973 Girauldon
(Continued)

FOREIGN PATENT DOCUMENTS

| CN | 1664397 A1 | 9/2005 |
|---|---|---|
| FR | 2296126 A1 | 7/1976 |
| JP | 2013204742 A | 10/2013 |

OTHER PUBLICATIONS

First Office Action for Chinese Patent Application No. 201880087574. 3, dated May 31, 2021, 12 pages.
(Continued)

*Primary Examiner* — Xuan Lan Nguyen
(74) *Attorney, Agent, or Firm* — Withrow & Terranova, PLLC (57) ABSTRACT

A wheel brake arrangement (100) for a wheel of a vehicle, the wheel brake arrangement comprising a brake pad (102) arranged to be controllable between a first stage in which the brake pad is connected to a brake disc for reducing the speed of the vehicle, and a second stage in which the brake pad is disconnected from the brake disc; and a carrier (104) connected to the brake pad for supporting the brake pad, wherein the wheel brake arrangement further comprising a resilient member (106) connected between the carrier (104) and the brake pad (102), the resilient member (106) comprising a first portion (108) connected to a surface (110) extending in a radial and tangential direction of the brake pad (102) and arranged to force the brake pad (102) away from the brake disc when the brake pad assumes the second stage, and a second portion (112) connected between a radially inner surface (114) of the brake pad (102) and a portion (116) of the carrier.

18 Claims, 4 Drawing Sheets

(51) Int. Cl.
   *F16D 55/225*    (2006.01)
   *F16D 65/00*     (2006.01)
   *F16D 65/097*    (2006.01)
   F16D 55/00       (2006.01)
   F16D 127/02      (2012.01)

(52) U.S. Cl.
   CPC .. F16D 65/0056 (2013.01); *F16D 2055/0008* (2013.01); *F16D 2127/02* (2013.01)

(58) Field of Classification Search
   USPC .................................. 188/73.31, 73.38, 72.3
   See application file for complete search history.

(56) References Cited

U.S. PATENT DOCUMENTS

| | | |
|---|---|---|
| 4,364,455 A | 12/1982 | Oshima |
| 8,397,880 B2 * | 3/2013 | Chelaidite ........... F16D 65/0978 |
| | | 188/73.31 |
| 2011/0168503 A1 | 7/2011 | Chelaidite |
| 2013/0256068 A1 | 10/2013 | Hazeki et al. |
| 2014/0339026 A1 | 11/2014 | Gutelius et al. |

OTHER PUBLICATIONS

International Search and Written Opinion for International Application No. PCT/EP2018/052528, dated Sep. 28, 2018, 9 pages.

* cited by examiner

WHEEL BRAKE ARRANGEMENT

This application is a 35 USC 371 national phase filing of International Application No. PCT/EP2018/052528, filed Feb. 1, 2018, the disclosure of which is incorporated herein by reference in its entirety.

TECHNICAL FIELD

The present invention relates to a wheel brake arrangement. The invention is applicable on vehicles, in particularly low, medium and heavy duty vehicles commonly referred to as trucks. Although the invention will mainly be described in relation to a truck, it may also be applicable for other type of vehicles comprising wheel brakes in the form of disc brakes.

BACKGROUND

In connection with vehicles in the form trucks, also known as low-, medium and heavy duty vehicles, there is always a high demand on the wheel brakes. These demands relate in particular to the braking capability of the wheel brake as they need to function properly in order to reduce vehicle speed properly.

Typically, the wheel brake comprises a brake disc connected to a wheel hub, which in turn is connected to a wheel of the vehicle. The wheel brake further comprises brake pads which are arranged to provide a brake action against the brake disc, i.e. clamp against the brake disc, such that a rotation speed of the wheel is reduced. The brake disc will thus slip against the brake pads until the wheel has stopped its motion. This creates frictional heat in the brake disc which needs to be taken care of. The brake pads are in turn connected to a carrier arranged to support the brake pad and keep it in its correct position.

Furthermore, as trucks continuously develop to meet various demands from the market, also the wheel brakes and its associated components are continuously developed to e.g. be more durable, more reliable, increase its ability of handling the developed frictional heat, improve its functionality, etc.

According to the abstract of U.S. Pat. No. 3,712,423, this document describes a disc brake comprising anti-rattle means interposed between the co-acting surfaces of a pad and a fixed support which consist of a wire spring carried by the pad and having one hair pin shaped projection extending toward the adjacent anchoring surface of the fixed support, said projection being continued at both ends by wire loops, the free ends of which anchor on the edge of the backing plate of said pad, said loops extending in two parallel planes at such a distance from one another that said spring is clamped on said plate.

According to its abstract, us2014339026 relates to a spreader spring comprising: a locking arm that connects the spreader spring to a brake component; a retraction arm; and a bias device located between the locking arm and the retraction arm; wherein the bias device includes six helical loops or more that store energy during a brake apply and once the brake apply is complete assist in retracting a brake pad.

According to a still further prior art document, US 2011/168503 describes in the abstract a clip comprising: a body portion; one or more arms connected to the body portion and projecting away from the body portion; a deformable portion of the one or more arms that is distal from the body portion; and a lip on the one or more arms that is proximate to the body portion.

Improvements in functionality are of particular interest and there is a desire to reduce the so-called parasitic drag between the brake pad and the brake disc after release of the brake pedal. The parasitic drag increases unnecessary wear of the brake pedal and also increases the overall fuel consumption for the vehicle, which makes it highly undesirable.

SUMMARY

It is an object of the present invention to provide a wheel brake arrangement which at least partially overcomes the above described deficiencies. This is achieved by a wheel brake arrangement according to claim 1.

According to a first aspect, there is provided a wheel brake arrangement for a wheel of a vehicle, the wheel brake arrangement comprising a brake pad arranged to be controllable between a first stage in which the brake pad is connected to a brake disc for reducing the speed of the vehicle, and a second stage in which the brake pad is disconnected from the brake disc; and a carrier connected to the brake pad for supporting the brake pad, wherein the wheel brake arrangement further comprising a resilient member connected between the carrier and the brake pad, the resilient member comprising a first portion connected to a surface extending in a radial and tangential direction of the brake pad and arranged to force the brake pad away from the brake disc when the brake pad assumes the second stage, and a second portion connected between a radially inner surface of the brake pad and a portion of the carrier.

The wording "brake pad" should be construed to include both a pad back plate and a pad material. Hence, the pad back plate is arranged to be supported by the carrier, and the pad material is arranged as a friction material which is connecting against the brake disc when the brake pad assumes the first stage. The pad material is thus arranged to face the brake disc.

The resilient member should be construed as a device which is able to force the brake pad away from the brake disc as well as to provide a compression force against the brake pad in the radial direction. The resilient member may thus preferably have springing characteristics and, as will be described below, be provided in the form of a torsion spring. Other alternative springs are also conceivable. The first and second portions of the resilient member may be fixedly connected to the brake pad, or merely arranged in abutment, i.e. non-fixedly connected to the brake pad. By means of fixedly connected should be understood such that portion of the resilient member are attached to the brake pad. Such attachment could be e.g. gluing, soldering, welding, etc. Hereby, connection to the carrier and assembly of the brake pad to the carrier will be simplified.

Furthermore, the surface extending in the radial and tangential direction of the brake pad should be construed as having a surface normal in the direction towards the brake disc. Also, the radially inner surface of the brake pad should be construed as a surface facing the hub of the wheel brake arrangement when assembled thereto.

An advantage of the invention is that the brake pad will be forced away from the brake disc when the brake is released. Hereby, the parasitic drag, i.e. the dragging of the brake pad against the brake disc after release of the brake pedal is reduced as the brake pad is forced away from the brake disc. Hereby, the overall fuel consumption will be reduced and the operational life time of the brake pad will be increased.

Also, the connection of the second portion between the radially inner surface of the brake pad and the portion of the carrier will act as a support for the brake pad, and may, as described further below provide a pre-compression force for the first portion of the resilient member. This pre-compression force is advantageous as it gives the first portion a force component in the axial direction which is sufficient for forcing the brake pad away from the brake disc when a braking event is ended.

According to an example embodiment, the connection between the second portion of the resilient member and the radially inner surface of the brake pad may generate a compression force between the first portion of the resilient member and the radially and tangentially extending surface of the brake pad for forcing the brake pad away from the brake disc when the brake pad assumes the second stage.

Hereby, before the resilient member is connected to the brake pad and the carrier, the resilient member is arranged in an unloaded state. Thereafter, the second portion of the resilient member will be sandwiched between the radially inner surface of the brake pad and the carrier, while the first portion is forced against the radially and tangentially extending surface of the brake pad. The latter is performed by pressing the first and second portions of the resilient member away from each other.

An advantage is thus that a spring pre-compression is achieved while at the same time the resilient member can give radial support for the brake pad.

According to an example embodiment, the resilient member may be a torsion spring, and wherein the first and second portions of the resilient member are a first and a second leg, respectively.

According to an example embodiment, the brake pad may comprise a radially extending recess portion in a surface of the brake pad arranged to face the brake disc, wherein the surface extending in a radial and tangential direction of the brake pad is located in the recess portion.

Hereby, a well defined position for the first portion of the resilient member is provided.

According to an example embodiment, the radially extending recess portion may extend from the radially inner surface of the brake pad.

According to an example embodiment, the carrier may comprise a cavity, wherein a mid-portion of the resilient member is positioned in the cavity. Hereby, a fit for the resilient member is provided.

According to an example embodiment, the mid-portion of the resilient member positioned in the cavity may be a coil shaped portion of the resilient member arranged between the first and second portions of the resilient member.

The coiled shaped portion can thus be positioned within the cavity such as not to conflict with e.g. the brake pad and the carrier.

According to an example embodiment, the cavity may be arranged in a radially extending protrusion of the carrier.

According to an example embodiment, the brake pad may comprise a cut-out portion having a substantially similar shape as the radially extending protrusion of the carrier.

Using a radially extending protrusion in combination with a cut-out portion enables for an improved connection between the carrier and the brake pad. This connection in combination with the resilient member increases the stability in the axial direction when moving the brake pad relative to the carrier during e.g. braking.

As is described below, the wheel brake arrangement may comprise a first and second resilient portion at a respective tangential end portion of the brake pad. Hereby, a first and second radially extending portion may also be provided at a respective tangential outer end portion. These first and second radially extending portions may be different in size and configuration in comparison to each other. The same applies for the cut-out portions of the brake pad. Hereby, the brake pad and carrier are un-symmetrical in their shape. The brake pad can thus only be connected to the carrier in one possible way which reduces the risk of assembling the brake pad in a non-correct manner. Various alternatives for achieving the un-symmetric configuration are also conceivable.

According to an example embodiment, the radially extending protrusion may be arranged at an intersection between a radially arranged seat surface and a tangentially arranged seat surface of the carrier, the radially and tangentially seat surfaces forming an area for fitting the brake pad to the carrier.

According to an example embodiment, the resilient member may be a first resilient member, wherein the wheel brake arrangement comprising a second resilient member, the first and second resilient members being arranged to connect to a respective left and right tangential end portion of the brake pad.

Hereby, the resilient members are arranged at the tangential end portions of the brake pad, which provides for a uniform removal of the brake pad relative to the carrier after the braking event is finished. Other positions are of course conceivable, such as, in addition or as an alternative, to position the resilient member at a tangential mid-portion of the brake pad.

Accordingly, further resilient members can also be conceivable to use, such as a third resilient member arranged at a position somewhere between the first and second resilient members as seen in the tangential direction of the brake pad.

According to a second aspect, there is provided a vehicle comprising a wheel, a brake disc connected to the wheel, and a wheel brake arrangement according to any one of the embodiments described above in relation to the first aspect.

Effects and features of the second aspect are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
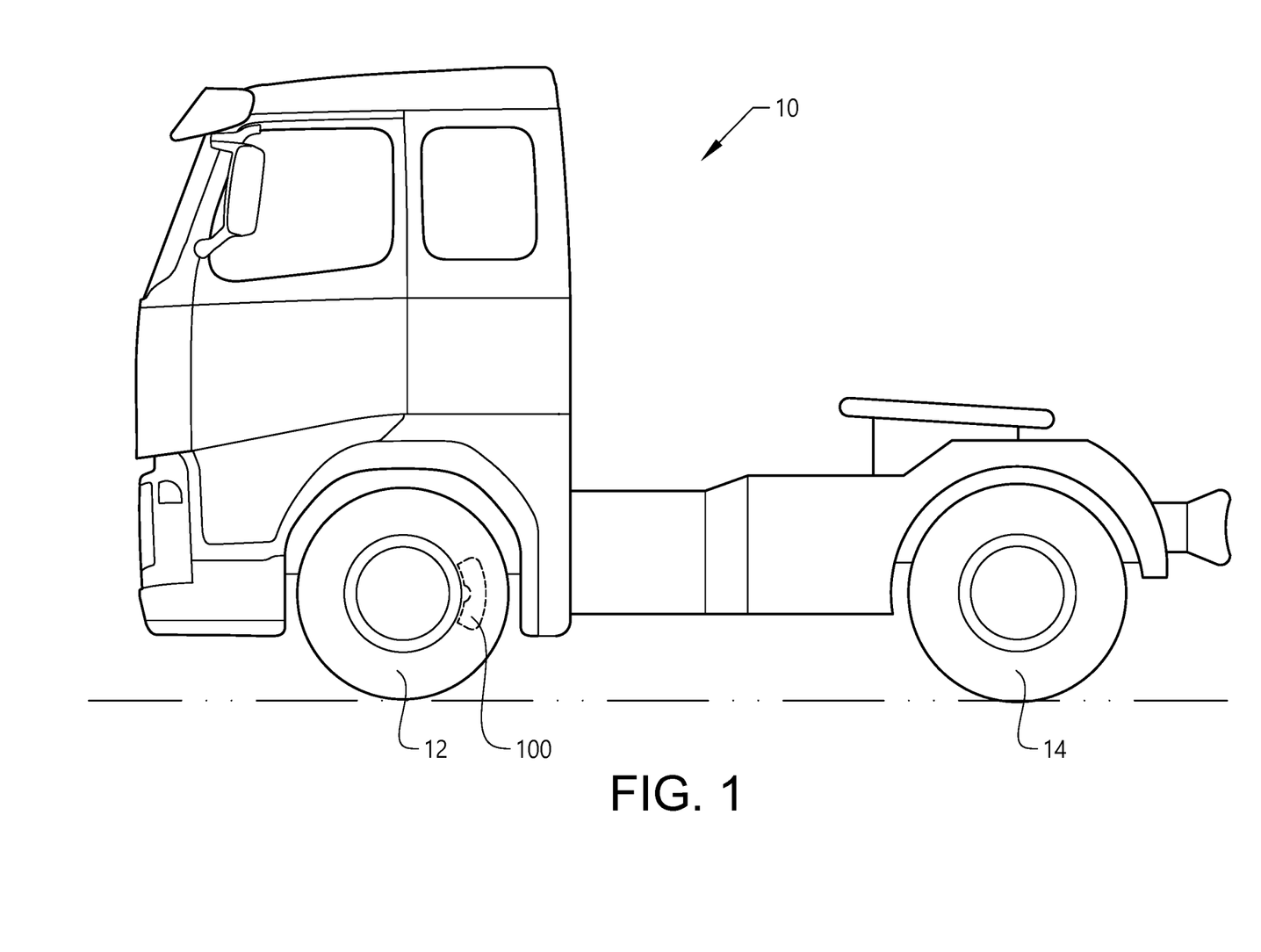
FIG. 1 is a lateral side view illustrating an example embodiment of a vehicle in the form of a truck.

With particular reference to FIG. 1, there is provided a vehicle 10 in the form of a truck for which a wheel brake arrangement 100 according to the present disclosure is particularly suitable for. The vehicle 100 comprises a pair of front wheels 12 and a pair of rear wheels 14. Although not depicted in FIG. 1, the vehicle may also comprise further pair of wheels as well. Moreover, as depicted, the front pair of wheels 12 comprises a wheel brake arrangement 100 arranged for controllably reducing the vehicle speed of the vehicle 10. The wheel brake arrangement 100 is operated by means of a controlling a brake pedal arranged in the vehicle compartment, or by means of a suitable control system. Although not depicted, also the rear wheels 14 may comprise a similar wheel brake arrangement 100 as the front wheels 12.

Figure 2:
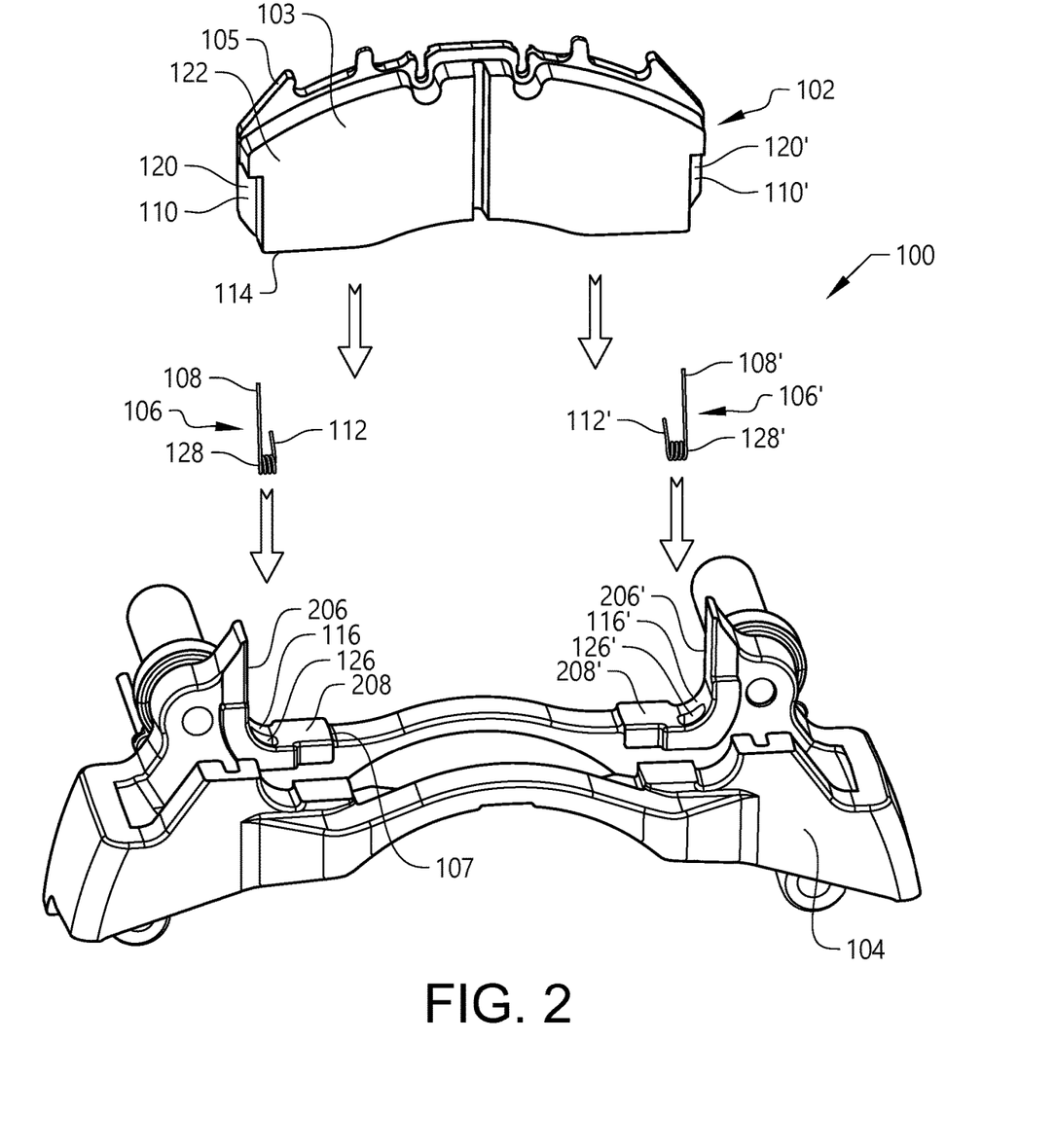
FIG. 2 is an exploded perspective view of a wheel brake arrangement according to an example embodiment.
Figure 3:
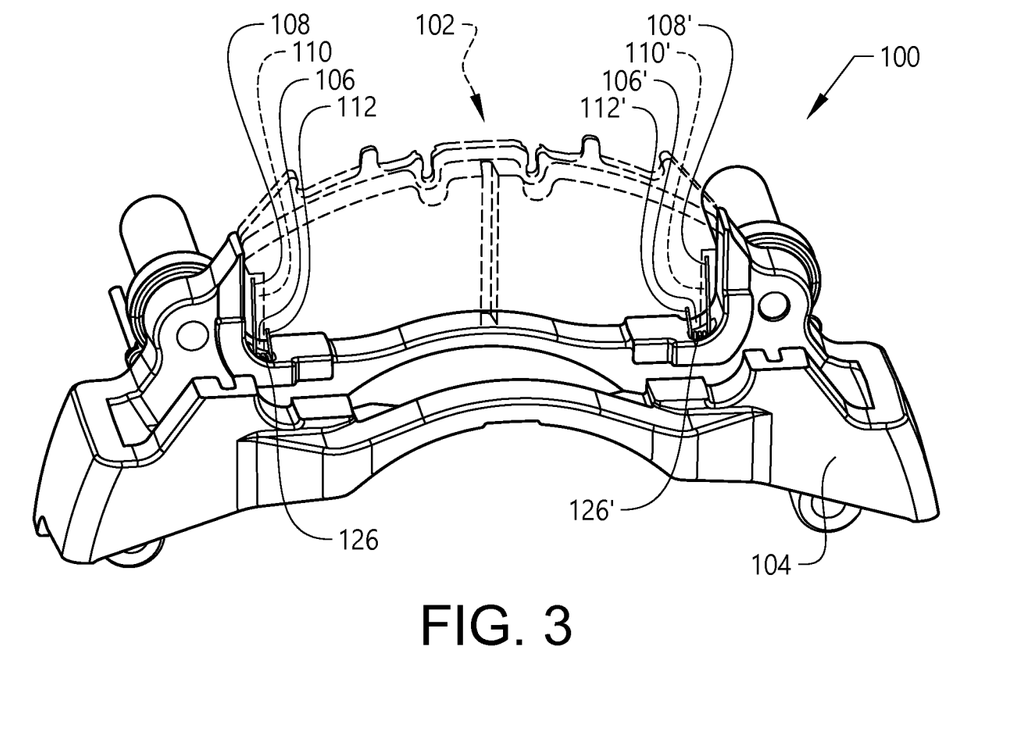
FIG. 3 is a perspective view of the wheel brake arrangement in FIG. 2 in an assembled configuration.
Figure 4:
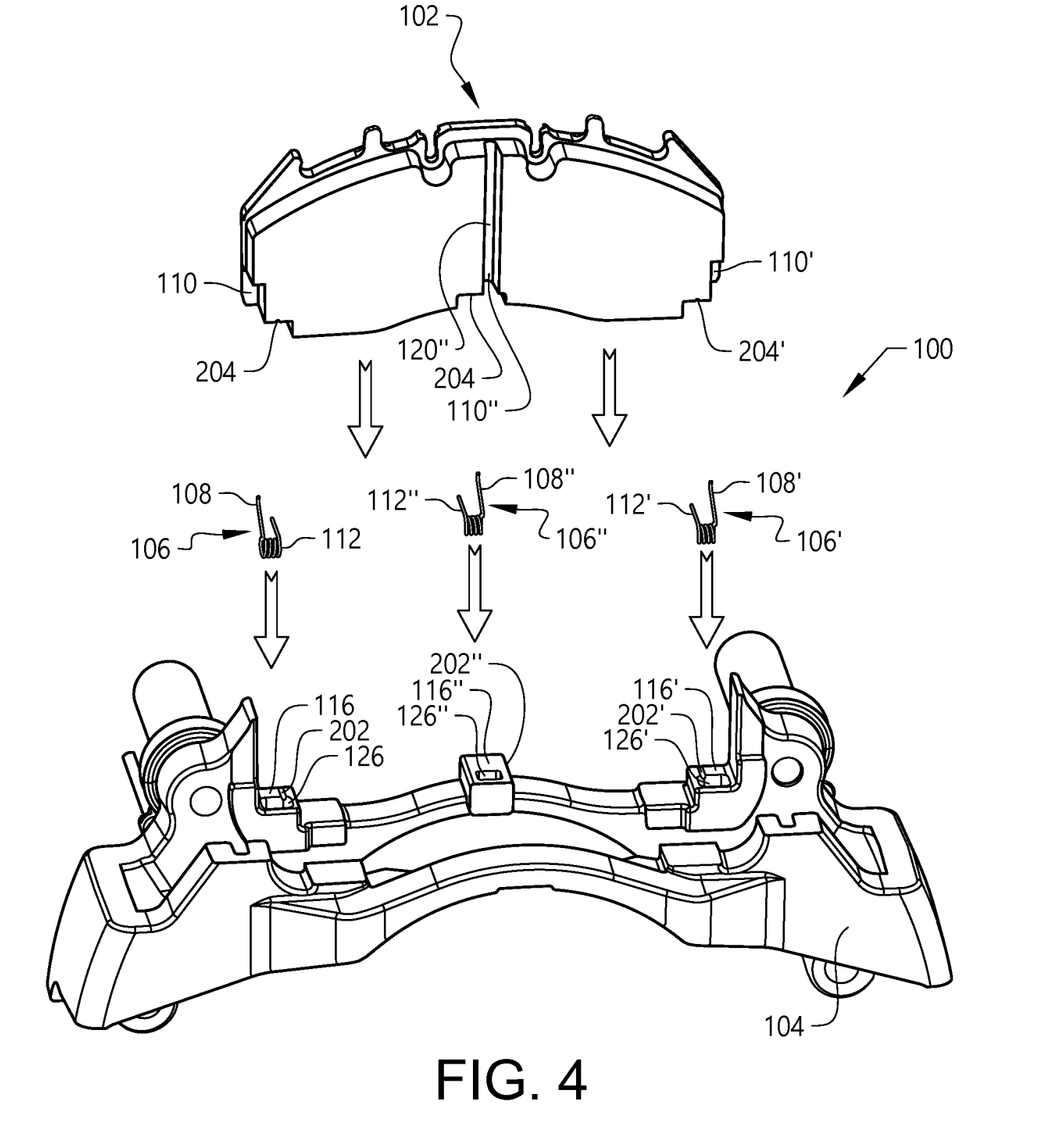
FIG. 4 is an exploded perspective view of a wheel brake arrangement according to another example embodiment.

In order to describe the wheel brake arrangement in further detail, reference is made to FIGS. 2-4 which illustrates various example embodiments thereof.

With reference to FIG. 2, an exploded view of a first example embodiment of the wheel brake arrangement 100 is depicted. The wheel brake arrangement 100 comprises a brake pad 102 comprising a friction material 103, i.e. a pad material, for abutting against a brake disc (not shown) during braking. The friction material 103 is in turn mounted to a pad back plate 105 of the brake pad 102.

Moreover, the wheel brake arrangement 100 further comprises a carrier 104 arranged to, amongst other, support the brake pad 102. The carrier 104 is in the example embodiment arranged with a U-shaped opening 107 arranged to receive the brake pad 102. The U-shaped opening 107 is formed by radially 206, 206' and horizontally 208, 208' seat surfaces of the carrier 104.

Still further, the wheel brake arrangement 100 also comprises a pair of resilient member 106, 106' connected between the brake pad 102 and the carrier 104 at a respective tangential end portion of the brake pad 102. According to the example embodiment depicted in FIG. 2, the resilient members 106, 106' are arranged as a respective torsion spring. In further detail, the torsion springs 106, 106' are connected between the brake pad 102 and the carrier 104 such that a first portion 108, i.e. a first leg 108, 108' of the torsion spring 106, 106' is connected to the brake pad 102 at a surface 110, 110' extending in the radial and tangential direction of the brake pad 102. Hence, the surfaces 110, 110' has a surface normal pointing in the direction towards the brake disc (not shown). In further detail, the surfaces 110, 110' are arranged in a respective radially extending recess portion 120, 120' of the brake pad 102. The radially extending recess portion 120, 120' extends from a radially inner surface 114 of the brake pad 102 and radially upwards a predetermined distance.

A second portion 112, 112', i.e. a second leg of the torsion spring 106, 106' is on the other hand connected between the radially inner surface 114 of the brake pad 102 and a respective portion 116, 116' of the carrier 104. Thus, in an assembled configuration as is depicted in FIG. 3, the second leg 112, 112' will be sandwiched between the radially inner surface 114 of the brake pad 102 and a respective portion 116, 116' of the carrier 104.

In further detail, the torsion springs 106, 106' are arranged in a respective cavity 126, 126' into which the torsion springs 106, 106 are positioned. The cavities 126, 126' extends in a radially downward direction in the carrier. In further detail, a coil-shaped mid-portion 128, 128' of the respective torsion spring is positioned within the respective cavity.

Turning to FIG. 3, which is a perspective view of the wheel brake arrangement in FIG. 2 in an assembled configuration. In FIG. 3, the carrier 104 and the torsion springs 106, 106' are depicted in solid lines, while the brake pad 102 is depicted in dashed lines. As can be seen in FIG. 3, the coil-shaped portions of the torsion springs 106, 106' are positioned within the respective cavity 126, 126'. Also, the first leg 108, 108' of the torsion springs 106 are forced against the radially and tangentially extending surface 110, 110' of the brake pad 102, while the second legs 112, 112' are sandwiched between the radially inner surface of the brake pad 102 and the facing portion of the carrier 104.

When the brake pad 102 is connected to the carrier 104, the second leg 112, 112' will be pressed between the carrier 104 and the brake pad 102. This will force the first leg to be directed towards the radially and tangentially extending surface 110 of the brake pad 102. Hereby, the torsion spring 106, 106' will be exposed to a pre-compression force acting in the direction towards the radially and tangentially extending surface 110 of the brake pad 102.

During operation of the wheel brake arrangement 100, the brake pad 102 will be pressed against the brake disc (not shown) when the brake is actuated, i.e. during braking. Hereby, the brake pad 102 is moved axially relative to the carrier 104. When the braking event is ended, the brake pad is moved away from the brake disc. The spring force between the first leg 108, 108' and the radially and tangentially extending surface 110 of the brake pad 102 will enable for an active movement of the brake pad away from the brake disc.

Reference is now made to FIG. 4 which is a perspective view of a wheel brake arrangement 100' according to another example embodiment. As can be seen in FIG. 4, the wheel brake arrangement 100' depicted therein comprises a third resilient member 106". The third resilient member 106", also in the form of a torsion spring, is arranged at a tangential mid-portion of the brake pad 102.

The third torsion spring 106" is arranged in a third cavity 126" in a similar manner as described above for the other torsion springs 106, 106'. Hence, the third torsion spring 106" comprises a first leg 108" connected to a radially and tangentially extending surface 110" arranged in a recess portion 120" of the brake pad 102, and a second leg 112" sandwiched between the radially inner surface 114 of the brake pad 102 and a portion 116" of the carrier 104.

As further depicted in FIG. 4, each of the cavities 116, 116', 116" are arranged in a radially extending protrusion 202, 202', 202" of the carrier 104. The brake pad 102 on the other hand comprises a respective cut-out portion 204, 204', 204". The cut-out portions 204, 204', 204" of the brake pad 102 should have a corresponding shape and size as its corresponding radially extending protrusion 202, 202', 202" of the carrier. Hereby, the connection between the carrier 104 and the brake pad 102 is improved as there is a reduced risk of connecting the brake pad 102 wrong. The different radially extending protrusion 202, 202', 202" must however not be arranged in a similar size and shape. On the contrary, the configuration of the radially extending protrusion 202, 202', 202" as well as the cut-out portions 204, 204', 204" of the brake pad 102 may form an asymmetric shape of the carrier 104 and the brake pad 102.

It is to be understood that the present invention is not limited to the embodiments described above and illustrated in the drawings; rather, the skilled person will recognize that many changes and modifications may be made within the scope of the appended claims. For example, the third resilient member may also be provided to the embodiment in FIGS. 2-3, i.e. without the use of the cavities arranged in the radially extending protrusions.

The invention claimed is:

1. A wheel brake arrangement for a wheel of a vehicle, the wheel brake arrangement comprising:
   a brake pad configured to be controllable between a first stage in which the brake pad abuts a brake disc for reducing a speed of the vehicle, and a second stage in which the brake pad is disconnected from the brake disc;
   a carrier support connected to the brake pad for supporting the brake pad, the carrier support comprising a cavity; and
   a resilient member connected between the carrier support and the brake pad, a mid-portion of the resilient member is positioned in the cavity, the resilient member comprising a first portion connected to a surface extending in a radial and tangential direction of the brake pad and configured to force the brake pad away from the brake disc when the brake pad assumes the second stage, and a second portion connected between a radially inner surface of the brake pad and a portion of the carrier,
   wherein the brake pad comprises a radially extending recess portion in a surface of the brake pad arranged to face the brake disc; and
   wherein the surface extending in a radial and tangential direction of the brake pad is located in the recess portion.

2. The wheel brake arrangement of claim 1, wherein the connection between the second portion of the resilient member and the radially inner surface of the brake pad is configured to generate a compression force between the first portion of the resilient member and the radially and tangentially extending surface of the brake pad for forcing the brake pad away from the brake disc when the brake pad assumes the second stage.

3. The wheel brake arrangement of claim 1 wherein:
   the resilient member is a torsion spring; and
   the first and second portions of the resilient member are a first and a second leg, respectively.

4. The wheel brake arrangement of claim 1, wherein the radially extending recess portion extends from the radially inner surface of the brake pad.

5. The wheel brake arrangement of claim 1, wherein the mid-portion of the resilient member positioned in the cavity is a coil shaped portion of the resilient member arranged between the first and second portions of the resilient member.

6. The wheel brake arrangement of claim 1, wherein the cavity is arranged in a radially extending protrusion of the carrier.

7. The wheel brake arrangement of claim 6, wherein the brake pad comprises a cut-out portion having a similar shape as the radially extending protrusion of the carrier.

8. The wheel brake arrangement of claim 6, wherein the radially extending protrusion is arranged at an intersection between a radially arranged seat surface and a tangentially arranged seat surface of the carrier, the radially and tangentially seat surfaces forming an area for fitting the brake pad to the carrier.

9. The wheel brake arrangement of claim 1 wherein:
   the resilient member is a first resilient member; and
   the wheel brake arrangement comprises a second resilient member, the first and second resilient members being arranged to connect to a respective left and right tangential end portion of the brake pad.

10. A vehicle comprising:
    a wheel;
    a brake disc connected to the wheel; and
    a wheel brake arrangement comprising:
       a brake pad configured to be controllable between a first stage in which the brake pad abuts the brake disc for reducing a speed of the vehicle, and a second stage in which the brake pad is disconnected from the brake disc;
       a carrier support connected to the brake pad for supporting the brake pad, the carrier support comprising a cavity; and
       a resilient member connected between the carrier support and the brake pad, a mid-portion of the resilient member is positioned in the cavity, the resilient member comprising a first portion connected to a surface extending in a radial and tangential direction of the brake pad and configured to force the brake pad away from the brake disc when the brake pad assumes the second stage, and a second portion connected between a radially inner surface of the brake pad and a portion of the carrier,
       wherein the brake pad comprises a radially extending recess portion in a surface of the brake pad arranged to face the brake disc; and
       wherein the surface extending in a radial and tangential direction of the brake pad is located in the recess portion.

11. The vehicle of claim 10, wherein the connection between the second portion of the resilient member and the radially inner surface of the brake pad is configured to generate a compression force between the first portion of the resilient member and the radially and tangentially extending surface of the brake pad for forcing the brake pad away from the brake disc when the brake pad assumes the second stage.

12. The vehicle of claim 10, wherein:
    the resilient member is a torsion spring; and
    the first and second portions of the resilient member are a first and a second leg, respectively.

13. The vehicle of claim 10, wherein the radially extending recess portion extends from the radially inner surface of the brake pad.

14. The vehicle of claim 10, wherein the mid-portion of the resilient member positioned in the cavity is a coil shaped portion of the resilient member arranged between the first and second portions of the resilient member.

15. The vehicle of claim 10, wherein the cavity is arranged in a radially extending protrusion of the carrier.

16. The vehicle of claim 15, wherein the brake pad comprises a cut-out portion having a similar shape as the radially extending protrusion of the carrier.

17. The vehicle of claim 15, wherein the radially extending protrusion is arranged at an intersection between a radially arranged seat surface and a tangentially arranged seat surface of the carrier, the radially and tangentially seat surfaces forming an area for fitting the brake pad to the carrier.

18. The vehicle of claim 10, wherein:
the resilient member is a first resilient member; and
the wheel brake arrangement comprising a second resilient member, the first and second resilient members being arranged to connect to a respective left and right tangential end portion of the brake pad.

* * * * *